United States Patent

[11] 3,626,512

| [72] | Inventor | Jean Michel Catherin<br>Savigny-sur-Orge, France |
|---|---|---|
| [21] | Appl. No. | 822,587 |
| [22] | Filed | May 7, 1969 |
| [45] | Patented | Dec. 7, 1971 |
| [73] | Assignee | Compagnie Generale D'Electricite<br>Paris, France |
| [32] | Priority | May 7, 1968 |
| [33] | | France |
| [31] | | 150778 |

[54] PROCESS AND APPARATUS FOR DETERMINING A REFERENCE DIRECTION
7 Claims, 2 Drawing Figs.

[52] U.S. Cl............................................. 356/141,
356/106 LR
[51] Int. Cl.......................................... G01b 11/26
[50] Field of Search............................................ 356/106,
140, 149, 141

[56] References Cited
UNITED STATES PATENTS
3,469,922  9/1969  Coccoli et al................. 356/106
FOREIGN PATENTS
1,513,419  1/1968  France .........................

OTHER REFERENCES
P. G. R. King, Institute of Navigation, London (1964) Vol. 17, pp. 300–305.

*Primary Examiner*—Rodney D. Bennett, Jr.
*Assistant Examiner*—S. C. Buczinski
*Attorney*—Sughrue, Rothwell, Mion, Zinn & Macpeak ABSTRACT: A process and an apparatus are disclosed for determining an unknown reference direction by means of a rotating unit which transmits a signal $f(\alpha-\Phi)$, $\alpha$ being the angular position of the unit in relation to a known reference direction, $\Phi$ being the angle between the said unknown reference direction and the known reference direction. A signal $f(\alpha)$ identical to the signal $f(\alpha-\Phi)$ is generated to the nearest constant multiplying factor. The operation $$\frac{1}{T}\int_0^{a\pi} f(\alpha-\Phi)\ f(\alpha)d(\alpha)$$

is performed by electronic means, $T$ being the rotation period of the said unit, the value of the resulting signal being $g$, which is the characteristic of the angle defining the position of the unknown reference direction in relation to the known reference direction.

PROCESS AND APPARATUS FOR DETERMINING A REFERENCE DIRECTION

BACKGROUND OF THE INVENTION

1. Field of the Invention

The present invention relates to means for and methods of precisely determining a reference direction by means of rotating members capable of supplying a signal which is a function of the angle defined by the angular position of this rotating member in relation to the said reference direction.

The present invention is applicable to a large number of cases in fields such as radar and goniometry. The present invention is more particularly but not exclusively applicable to means for detecting the direction of the axis of the earth's rotation.

The present invention is to be described in detail in connection with the particular case in which the rotating member referred to above is a laser gyrometer, but it is obvious that different rotating members can be employed, without departing from the scope of the invention.

2. Description of the Prior Art

It is known that a laser gyrometer supplies, at the output of a beat frequency detector, a signal having the frequency:

$$f_R = K \cdot \vec{R} \cdot \vec{n}$$

$K$ being a constant, $\vec{n}$ being the vector normal to the plane of the gyrometer, $\vec{R}$ being the rotation vector, of which the magnitude is equal to the value of the speed of rotation and of which the orientation is defined by the normal to the plane in which the rotation is effected and of which the direction is defined so that the linear speed vector is directed towards the left of an observer lying on the rotation vector.

When a laser gyrometer is arranged to rotate about any axis (rotation vector $\vec{\omega}$) fixed in relation to the earth, the beat frequency due to the rotation of earth is added to the beat frequency due to the rotation $\vec{\omega}$. If the axis $\vec{\omega}$ passes through the plane of the gyrometer, the product $\vec{\omega} \cdot \vec{n}$ is zero and all that remain are the beat frequency $f\Omega$ due to the rotation of the earth, a constant frequency $f_a$ due to the shift of the zero of the gyrometer and an indefinite frequency $f_b$ known as noise frequency.

The rotation vector of the earth being $\vec{\Omega}$, the total frequency provided by the gyrometer is thus:

$$f = f_a + f_b + f_\Omega = f_a + f_b + K \cdot \vec{\Omega} \cdot \vec{n}$$
$$= f_a + f_b + K \cdot \Omega \cdot \cos(\Omega, n)$$

This expression can be written in the following manner:

$$f = f_o + K \cdot \cos(\alpha - \Phi)$$

$\alpha$ being the angular position of the normal of the gyrometer with respect to a known reference direction in the plane perpendicular to the axis of rotation $\vec{\omega}$ of the gyrometer, and $\Phi$ being the angle defined by this known reference direction $N_o$ with the projection $\vec{N}$ of the axis $\vec{\omega}$ on the same plane, this projection $\vec{N}$ indicating the direction of geographical North.

SUMMARY OF THE INVENTION

The present invention, applied to the case of establishing the direction of geographical North, has for its object a method of and a means for permitting the value of the angle $\Phi$ as defined above to be established.

In more general terms, the present invention has for its object a method of establishing an unknown reference direction by means of a rotating member supplying a signal $f(\alpha - \Phi)$, $\alpha$ being the angular position of the member relatively to a known reference direction and $\Phi$ being the angle of the known direction with the unknown reference direction.

The method according to the invention is particularly characterized by generating the function $f(\alpha)$ identical with the function $f(\alpha - \Phi)$, except for a constant multiplicative coefficient, by effecting by electronic means the operation $$\frac{1}{T} \int_0^{2\pi} f(\alpha - \rho) f(\alpha) d\alpha$$

$T$ being the period of rotation of the said rotating member, the result obtained being a value $g$ characteristic of the angle defining the position of the unknown reference direction with respect to the known reference direction.

According to one particular form of the method according to the invention, with the function $f(\alpha - \Phi)$ being equal to $A \cos(\alpha - \Phi)$, the generated function $f(\alpha)$ is equal to $B \sin \alpha$, the value $g$ obtained being equal to $AB/2 \sin \Phi$.

According to another form of the method, a second function $f'(\alpha) = B \cos \alpha$ is generated and, in the same manner, the value $g' = AB/2 \cos \Phi$ is obtained and the division $g/g' = \tan \Phi$, is effected electronically.

According to another feature of the present invention, a known reference direction very close to the unknown reference direction is chosen, the expressions $g$ and $g/g'$ then directly giving the values $C\Phi$ and $\Phi$, $C$ being a constant.

The present invention is also concerned with a means for carrying the above method into effect, particularly characterized in that the said rotating member is a laser gyrometer supplying at its output a signal $f = A \cos(\alpha - \Phi)$, $\Phi$ being the angle defined by a known reference direction with the direction of geographical North, $\alpha$ being the angular position of the normal to the plane of the gyrometer with respect to the said known reference direction, the angle $\alpha$ being measured by an angular encoder connected to the rotating shaft on which the said gyrometer is mounted, the said encoder controlling a generator circuit of the function $B \sin \alpha$, of which the output is connected to one of the inputs of an electronic circuit effecting the operation $$\frac{1}{T} \int_0^{2\pi} A \cos(\alpha - \rho) B \sin \alpha \, d\alpha$$

the signal $A \cos(\alpha - \Phi)$ being introduced into the other input of the said electronic circuit.

According to another feature of the present invention, the said generator is a memory in which are recorded the successive values of the function $f(\alpha)$, the said generator being controlled by the said encoder formed by at least one transit detector cooperating with indices disposed on the rotating member.

BRIEF DESCRIPTION OF THE DRAWINGS

Other features and advantages will become apparent from reading the following detailed description and by reference to the accompanying drawings, given as an illustrative and nonlimitative example, and in which.

DESCRIPTION OF THE PREFERRED EMBODIMENT

Figure 1:
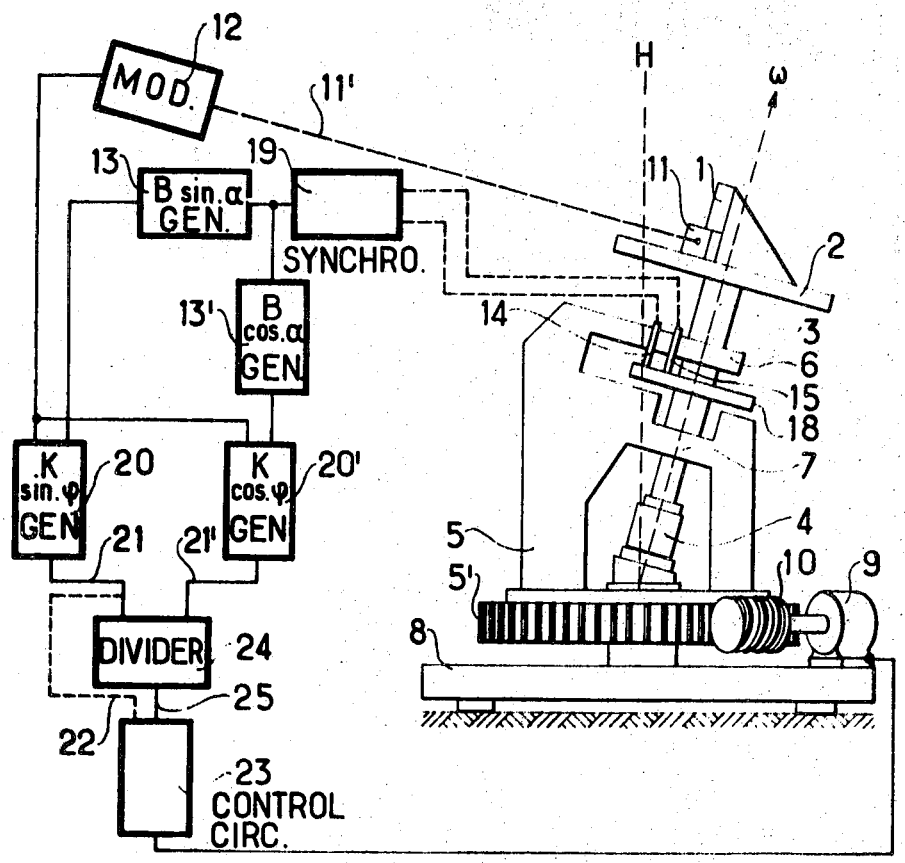
FIG. 1 is a diagrammatic view of a North detector according to the invention.

In the two figures, the same parts bear the same reference numerals.

The means according to the invention comprise a ring laser 1 disposed on a plate 2 mounted on a shaft 3 which is rotated by a motor 4, of which the casing is fixed to a rigid structure 5 comprising bearings 6 and 7 which support the shaft 3.

The rigid structure 5 is fixedly attached to a plate 5' which is capable of turning about a pivot (not shown) carried by a platform 8.

The plate 5' can be driven in rotation by a servomotor 9 through a reduction gear 10.

The laser 1 comprises a detector 11 supplying a signal corresponding to the beat of the progressive waves of the laser, modulated by the function $\cos(\alpha - \Phi)$, due to the rotation of the plate 2.

The detector 11 is connected to a modulator circuit 12 by an appropriate and conventional electrical connection, represented diagrammatically by a line 11', which can for example be a conductor connected to a sliding contact disposed on the plate 2, which supplies at its output a signal $A \cos(\alpha - \Phi)$, $\alpha$ being the angular position of the plate taken from a known reference direction, for example, that defined by the plane of the structure 5.

According to the present invention, the means comprise an angular encoder supplying at any instant the value of $\alpha$. This angular encoder is connected to the input of a circuit 13 supplying the signal $B \sin \alpha$ at its output.

The encoder and the circuit 13 can be of any type, for example an analogue encoder controlling a frequency generator.

Figure 2:
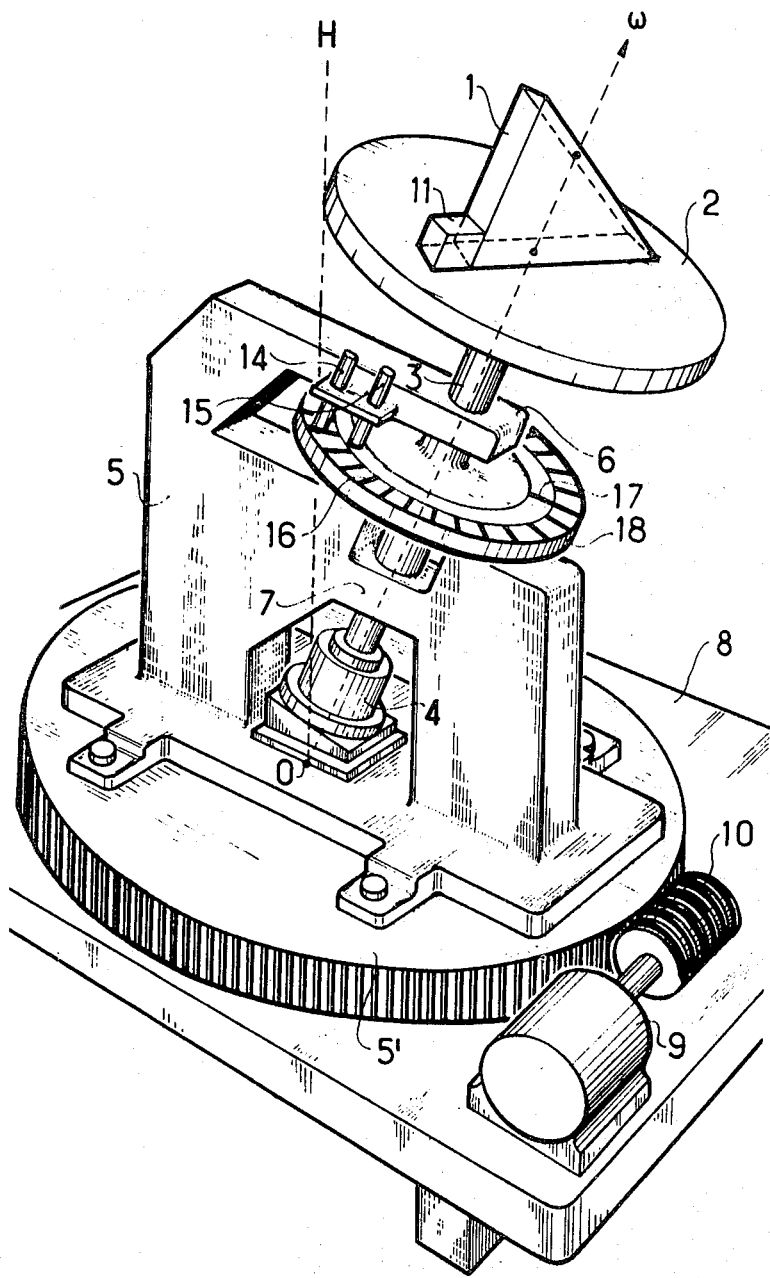
FIG. 2 is a perspective view of the same North detector according to the invention.

According to a preferred embodiment of the invention, which is by no means limitative, the angular encoder can be a numerical encoder formed by one or two transit detectors such as 14 and 15 cooperating with indices, such as 16 and 17 (FIG. 2), disposed on a plate 18 fixedly attached to the shaft 3. An electronic circuit 19 processes the information given by the detectors 14 and 15 and controls the circuit 13 which supplies the signal $B \sin \alpha$. According to one particular embodiment, the circuit 13 can be a memory, in which have been recorded the successive values of the signal $B \sin \alpha$.

The outputs of the circuits 13 and 12, respectively supplying the signals $B \sin \alpha$ and $A \cos (\alpha - \Phi)$, are connected to the inputs of an electronic circuit 20, which delivers the signal $K \sin \Phi$ at the output 21.

This signal can be transmitted through a line 22 to a control circuit 23 controlling the running of the motor 9 causing the plate 5' to turn, until the plane of the structure 5 coincides with the direction of North (the angle $\Phi$ is then zero).

According to one particular embodiment of the present invention, the electronic circuit comprises a second circuit 13' similar to the circuit 13, but supplying the function $B \cos \alpha$. The introduction of this signal $B \cos \alpha$ and of the signal $A \cos (\alpha - \Phi)$, provided by the circuit 12, to the inputs of a circuit 20' similar to the circuit 20, permits the signal $K \cos \Phi$ to be obtained at the output 21'.

The outputs 21 and 21' are then connected to the inputs of a divider 24, which provides at its output 25 the signal $$(K \sin \Phi)/(K \cos \Phi) = \tan \Phi.$$

The signal permits the direct recording of the angle of the plane of the structure 5 with North or even this signal is supplied to the control circuit 23 which controls the servomotor 9, so as to cancel out the angle $\Phi$.

In the case where the circuits 12 and 13 provide the signals $f_1 = A \cos (\alpha - \Phi)$ and $f_2 = B \sin \Phi$ in the form of their mean value each angular interval defined by two consecutive indices of the plate 18, the circuit 20 will be reduced to a multiplier receiving at each instant the values $f_{1i}$ and $f_{2i}$ and supplying at the output the value $f_{1i} \cdot f_{2i}$. It will then be sufficient to introduce this value into the input of an adder, which will supply at its output, with each rotation of the laser, the signal $$\Sigma i f_{1i} \cdot f_{2i}$$

which will in fact be equal to $$\int_0^{2\pi} A \cos (\alpha - \rho) \sin \alpha \, d\alpha = K \cos \rho$$

The correlation procedure used by the method according to the invention offers numerous advantages with respect to all the other known methods, permitting a reference direction to be registered by the processing of the information contained in a signal supplied by a rotating member.

The means for determining the direction of the axis of the earth's rotation comprises an arrangement by which the positions of the gyrometer corresponding to the minimum of the beat frequency are detected. The detection means comprise an index fixedly attached to the gyrometer and a movable index, the coincidence of these two indices causing the sending of a pulse which triggers an inverter, thus inverting twice for each revolution the polarity of the frequency variation curve of the gyrometer. In this way, an error signal is obtained, by which is controlled the position of the said movable index.

The error signal is cancelled out when the said pulses coincide with the minima of the variation curve of the gyrometer beat frequency, thus determining the position of the movable index corresponding to the direction of the axis of the earth's rotation. The synchronous detection method used by the arrangement described above has certain disadvantages: actually, the synchronous detection introduces a rotation relative to the ground and thus there is the danger of a systematic error being introduced, since this rotation cannot perfect. A calibrating and zero method permits this error to be reduced, but not cancelled out. On the other hand, the synchronous detection causes intervention of the time parameter, because the gyrometer measures a value which is only associated with the respective position of its axis and the axis of the poles. Now, by principle, the synchronous detection indicates the coincidence as a function of time between a signal and a reference signal. Since the reference signal originates from an angular coincidence between the index and the gyrometer axis, it will be necessary to assure throughout the chain a coincidence of the parameters in time and in space. For an accuracy of 1 minute of arc, this assumes that the speed of rotation of the gyrometer and the agreement of the selected amplifier which forms part of the chain are stable to about $10^{-5}$ in order to produce a sufficient elimination of the uneven harmonics due to the overvoltage of the filter associated with the amplifier.

The synchronous detection necessitates a selective amplification, which makes difficult the operation at a speed of the order of a fraction of a revolution per second, since this requires the construction of stable selective amplifiers matched to 0.1 c.p.s. for example. In this case, it is necessary to have an extremely long starting-up time, imposed by the length of the transient running conditions.

The present invention uses analogue measurements or numerical measurements. The latter type of measurement is, however, preferred, because the analogue measurement comprises in itself disadvantages due to the fact that its accuracy is limited to a few percent at best, which can restrict the absolute accuracy obtained, and because it necessarily comprises elements subject to deviation.

The invention is obviously not limited in any way to the embodiment which has been described and illustrated, this only having been given by way of example. In particular, without departing from the scope of the invention, it is possible to incorporate modifications in detail, to change certain arrangements or to replace certain means by equivalent means.

I claim

1. Apparatus permitting the establishment of an unknown reference direction on a rotating body about an axis, comprising:
    a. rotating means for supplying a signal $f(\alpha - \Phi)$, $\alpha$ being the angular position of the rotating means relative to a known reference direction and $\Phi$ being the angle between the known reference direction and the unknown reference direction;
    b. means for generating a signal $f(\alpha)$ identical with the signal $f(\alpha - \Phi)$ except for a constant multiplier coefficient; and
    c. electronic computing means connected to said rotating member and said generating means for effecting the operation $$\frac{1}{T} \int_0^{2\pi} 2\pi f(\alpha - \rho) f(\alpha) d\alpha$$

$T$ being the period of revolution of the rotating means, said electronic computing means delivering a signal resulting from the operation having a value $g$ characteristic of the angle defining the position of the unknown reference direction relative to the known reference direction.

2. Apparatus according to claim 1 wherein said rotating means comprises
    a. a plate,
    b. means for imparting a rotation movement to said plate, and
    c. a laser gyrometer disposed on said plate.

3. Apparatus according to claim 2 wherein said laser gyrometer includes a beat detector for detecting the beats of the two progressive waves traveling in opposite directions in said laser gyrometer, and further comprising a demodulator connected to said beat detector and delivering at its output a signal proportional to $f(\alpha-\Phi)$.

4. Apparatus according to claim 1 wherein said generating means includes an angular encoder fixedly attached to said rotating means.

5. Apparatus according to claim 4 wherein said angular encoder is a numerical encoder.

6. Apparatus according to claim 4 wherein said angular encoder comprises
   a. a disc carrying on its periphery regularly spaced indices, said disc rotating with said rotating means and
   b. transit detectors fixed with respect to said known reference direction for detecting the passage of said indices as said disc rotates.

7. Apparatus according to claim 4 wherein said generating means includes a memory for periodically storing a value proportional to the signal $f(\alpha)$.

* * * * *